(12) United States Patent  
Seo

(10) Patent No.: US 7,437,064 B2  
(45) Date of Patent: Oct. 14, 2008

(54) DRIVE MECHANISM FOR CAMERA

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 198 days.

(21) Appl. No.: 11/275,138

(22) Filed: Dec. 14, 2005

(65) Prior Publication Data

US 2006/0127072 A1    Jun. 15, 2006

(30) Foreign Application Priority Data

Dec. 15, 2004    (JP) ............................. 2004-362842

(51) Int. Cl.
  *G03B 17/00*    (2006.01)
  *G03B 3/10*    (2006.01)
  *H04N 5/228*    (2006.01)
(52) U.S. Cl. ..................... 396/75; 396/133; 348/208.4
(58) Field of Classification Search .................. 396/52, 396/55, 89, 133, 144, 72, 75; 348/208.4, 348/208.7, 208.8, 208.11
See application file for complete search history.

(56) References Cited

U.S. PATENT DOCUMENTS

| | | | | |
|---|---|---|---|---|
| 4,721,999 A | * | 1/1988 | Takemura et al. | 348/276 |
| 5,172,276 A | * | 12/1992 | Ueyama et al. | 359/813 |
| 5,416,558 A | * | 5/1995 | Katayama et al. | 396/52 |
| 5,838,374 A | * | 11/1998 | Kikuchi | 348/351 |
| 2001/0026683 A1 | * | 10/2001 | Morimoto et al. | 396/89 |
| 2003/0067544 A1 | * | 4/2003 | Wada | 348/208.7 |
| 2004/0201707 A1 | * | 10/2004 | Noguchi et al. | 348/208.7 |
| 2005/0157287 A1 | | 7/2005 | Seo | |
| 2005/0185057 A1 | | 8/2005 | Seo | |
| 2005/0204640 A1 | | 9/2005 | Seo | |
| 2005/0264656 A1 | | 12/2005 | Seo et al. | |
| 2006/0007320 A1 | | 1/2006 | Seo | |
| 2006/0017818 A1 | | 1/2006 | Enomoto | |

FOREIGN PATENT DOCUMENTS

| | | |
|---|---|---|
| JP | 8-154196 | 6/1996 |
| JP | 8-304868 | 11/1996 |

OTHER PUBLICATIONS

English language Abstract of JP 8-154196.

* cited by examiner

*Primary Examiner*—Rodney E Fuller
(74) *Attorney, Agent, or Firm*—Greenblum & Bernstein, P.L.C.

(57) ABSTRACT

A drive mechanism for a camera includes a movable member located behind a photographing lens and linearly moved along an optical axis thereof, the movable member supporting an image pickup device; an AF coil secured to the movable member or an immovable member of the camera; a magnetic force generating device which is secured to the other of the movable member and the immovable member, so as to linearly move the movable member in the optical axis direction relative to the immovable member by applying a magnetic field upon the AF coil; and a controller which controls the direction of electric current flowing in the AF coil so that image light transmitted through the photographing lens is converged onto an image pickup surface of the image pickup device. The AF coil is a planar coil which is wound on a plane parallel with the optical axis.

14 Claims, 17 Drawing Sheets

DRIVE MECHANISM FOR CAMERA

BACKGROUND OF THE INVENTION

1. Field of the Invention

The present invention relates to a drive mechanism for a camera, such as an AF mechanism or a camera shake correction mechanism.

2. Description of the Related Art

In an example of a known AF mechanism of a digital camera, a CCD (image pickup device) is moved in an optical axis direction in accordance with contrast information of image data of an object image picked-up by the CCD, so that the image light transmitted through a photographing lens is always converged onto an image pickup surface of the CCD (e.g., Japanese Unexamined Patent Publication No. 8-154196).

In this AF mechanisms a driving device is used as an electromagnetic drive device to move the CCD in the optical axis direction. Specifically, a permanent magnet is provided on the camera body side, a substantially cylindrical yoke is provided on the camera body side and which is located inside the permanent magnet, and a cylindrical voice coil is provided on a support which supports the CCD and which is located in a cylindrical space defined between the permanent magnet and the yoke, and coaxial to the yoke.

A CPU (Central processing Unit) incorporated in the digital camera supplies a predetermined amount of electric current to the voice coil for a predetermined period of time, while controlling the direction thereof, in accordance with contrast information of data of an object image picked-up by the CCD. Consequently, the CCD is linearly moved by a predetermined amount in the optical axis direction so that the image light transmitted through the photographing lens is converged onto the image pickup surface.

Since the voice coil and the yoke, that constitute the electromagnetic drive device used in Japanese Unexamined Patent Publication No. 8-154196, are cylindrical in shape, the size of the electromagnetic drive device is large in the optical axis direction (forward/backward direction) and in the upward/downward direction and right/left direction, perpendicular to the optical axis direction. Moreover, if the drive force of the electromagnetic drive device is increased so as to achieve a high-speed AF operation, the size of the voice coil and the yoke is increased in the optical axis direction and directions orthogonal thereto. Under these circumstances, it is difficult to miniaturize the digital camera if the electromagnetic drive device is used, Furthermore, the voice coil which is large in size, is also heavy. Therefore, it is difficult to move a support which holds the voice coil at a high speed. In order to move the support at a high speed, it is necessary to increase the power consumption. Also, the manufacturing cost of the cylindrical voice coil is high.

SUMMARY OF THE INVENTION

The present invention provides a drive mechanism for a camera which is smaller and less expensive and can move the image pickup device or an optical element using less power consumption than that of a conventional drive mechanism.

According to an aspect of the present invention, a drive mechanism for a camera is provided, including a movable member which is located behind a photographing lens and which is linearly moved along an optical axis of the photographing lens, the movable member supporting an image pickup device; an AF coil secured to one of the movable member and an immovable member of the camera; a magnetic force generating device which is secured to the other of the movable member and the immovable member, so as to linearly move the movable member in the optical axis direction relative to the immovable member by applying a magnetic field upon the AF coil; and a controller which controls the direction of electric current flowing in the AF coil so that image light transmitted through the photographing lens is converged onto an image pickup surface of the image pickup device. The AF coil is a planar coil which is wound on a plane parallel with the optical axis.

It is desirable for the immovable member of the camera to include a camera body or a lens barrel provided with the camera body.

The drive mechanism can include a camera shake detection sensor for detecting a camera shake of the camera body; a camera shake correction coil secured to one of the movable member and the camera body; and a magnetic force generating device which is secured to the other of the movable member and the camera body to linearly move the movable member relative to the camera body in orthogonal X and Y directions perpendicular to the optical axis by applying a magnetic field upon the camera shake correction coil. The controller is controlled to supply electric current to the camera shake correction coil in accordance with camera shake information detected by the camera shake detection sensor to thereby correct the camera shake via the movement of the movable member in the orthogonal X and Y directions.

It is desirable for the magnetic force generating devices to be secured to the camera body side, and the AF coil and the camera shake correction coil to be secured to a common support plate integral with the movable member.

It is desirable for each of the magnetic force generating devices to include a yoke provided with a pair of plate portions parallel with the AF coil and the camera shake correction coil so that the common support plate is located between the pair of plate portions, and a magnet which is secured to one of the pair of plate portions of the yoke to form a magnetic circuit between the magnet and the other of the pair of plate portions in order to produce a magnetic force to be applied to the AF coil and the camera shake correction coil.

In an embodiment, a drive mechanism for a camera is provided, including a focusing lens which forms a part of a photographing lens system; a movable member which supports the focusing lens and which is linearly movable along an optical axis of the photographing lens system, an image pickup device located behind the photographing lens system; an AF coil secured to one of the movable member and an immovable member of the camera; a magnetic force generating device which is secured to the other of the movable member and the immovable member, to linearly move the focusing lens by applying a magnetic field upon the AF coil in the optical axis direction relative to the immovable member; and a controller which controls a direction of electric current flowing in the AF coil so that image light transmitted through the photographing lens system is converged onto an image pickup surface of the image pickup device. The AF coil is a planar coil which is wound on a plane parallel with the optical axis.

It is desirable for the immovable member of the camera to include a camera body or a lens barrel provided with the camera body.

It is desirable for the focusing lens to serve also as a correction lens and wherein the drive mechanism further includes a camera shake detection sensor for detecting a camera shake of the camera body; a camera shake correction coil secured to one of the movable member and the camera body; and a magnetic force generating device which is secured to the other of the movable member and the camera body, to linearly move the movable member relative to the camera body in orthogonal X and Y directions perpendicular to the optical axis by applying a magnetic field upon the camera shake correction coil. The controller is controlled to supply electric current to the camera shake correction coil in accordance with camera shake information detected by the camera shake detection sensor to thereby correct the camera shake via movement of the movable member, to which the correction lens is supported, in the orthogonal X and Y directions.

It is desirable for the magnetic force generating devices to be secured to the camera body side, and the AF coil and the camera shake correction coil to be secured to a common support plate integral with the movable member.

It is desirable for each of the magnetic force generating devices to include a yoke provided with a pair of plate portions parallel with the AS coil and the camera shake correction coil so that the common support plate is located between the pair of plate portions, and a magnet which is secured to one of the pair of plate portions of the yoke to form a magnetic circuit between the magnet and the other of the pair of plate portions in order to produce a magnetic force to be applied to the AF coil and the camera shake correction coil.

It is desirable for the controller to control the magnitude of the electric current.

In an embodiment, a drive mechanism for a camera is provided, including a movable member which is located behind a photographing lens and which is linearly moved along an optical axis of the photographing lens, the movable member supporting an optical filter, wherein an image pickup device is provided behind the movable member and supported by an immovable member of the camera; an AF coil secured to one of the movable member and the immovable member; a magnetic force generating device which is secured to the other of the movable member and the immovable member, so as to linearly move the movable member in the optical axis direction relative to the immovable member by applying a magnetic field upon the AF coil; and a controller which controls the direction of electric current flowing in the AF coil so that image light transmitted through the photographing lens is converged onto an image pickup surface of the image pickup device. The AF coil is a planar coil which is wound on a plane parallel with the optical axis.

It is desirable for the immovable member of the camera to include a camera body or a lens barrel provided with the camera body.

It is desirable for the optical filter to include a low-pass filter having a concave portion or a convex portion so as to provide a lens function therein.

The present disclosure relates to subject matter contained in Japanese Patent Application No. 2004-362842 (filed on Dec. 15, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
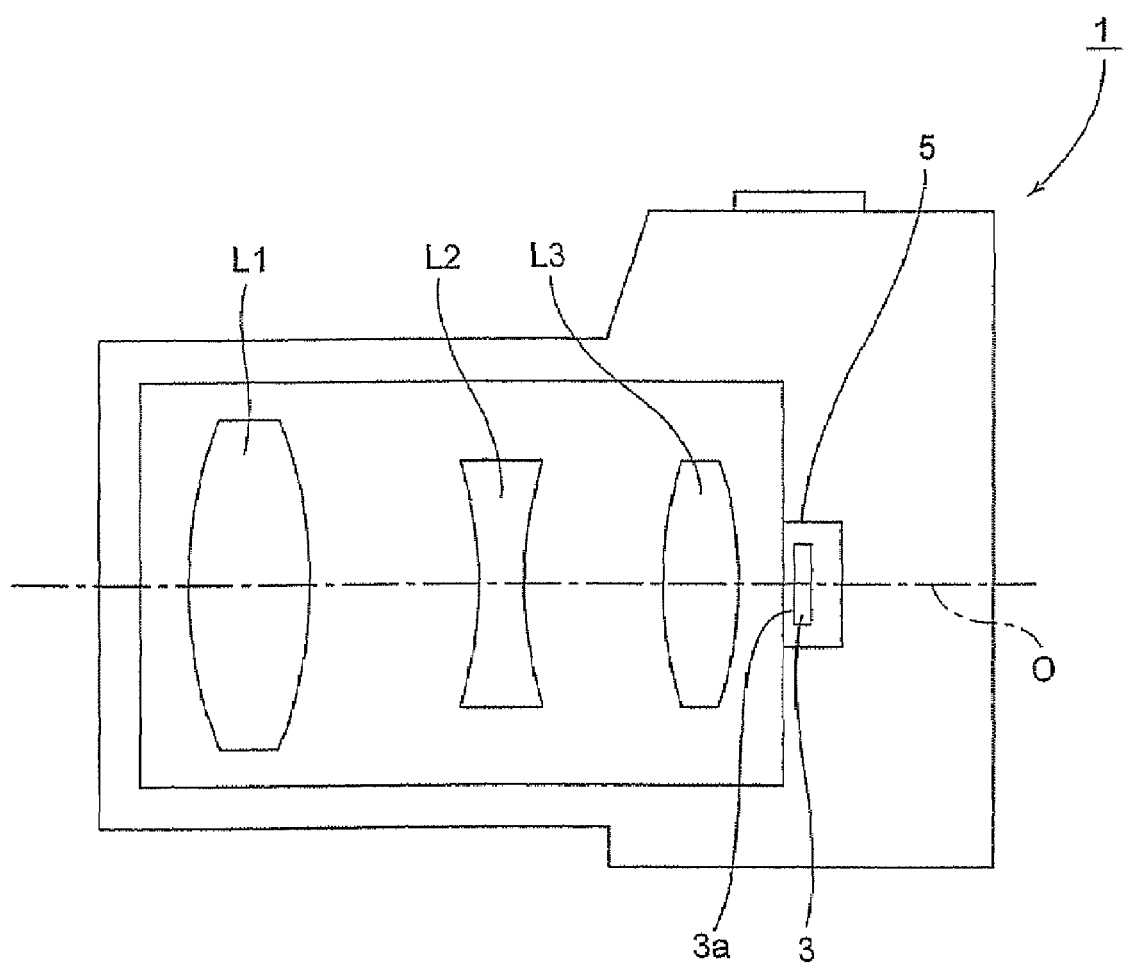
FIG. 1 is a longitudinal sectional view of a digital camera having a CCD drive mechanism incorporated therein, according to an embodiment of the present invention.

As shown in FIG. 1, a digital camera 1 has an optical system (photographing lens system) including a plurality of lenses L1, L2, and L3, in a camera body (immovable member). A CCD (image pickup device) 3 is provided behind the lens L3. The CCD 3 has an image pickup surface 3a perpendicular to the optical axis O of the optical system and is secured to a CCD drive mechanism 5 incorporated in the digital camera (camera body/immovable member) 1.

The CCD drive mechanism (magnetic drive mechanism) 5 is provided with an AF (Auto-focus) function and a camera shake correcting function and is constructed as shown in FIGS. 2 through 18. As can be seen in FIGS. 2 through 6, a stationary support plate 10, which is square in shape as viewed from the rear side thereof and is provided at its center portion with a square receiving hole 10a, is secured to the camera body of the digital camera 1 by a securing device (not shown), so that the support plate 10 is perpendicular to the optical axis O and the optical axis O is located at the center of the receiving hole 10a. The stationary support plate 10 is provided on its rear surface with a pair of upper and lower cylindrical Z-direction guide rods 11 extending rearward therefrom in a Z-direction (indicated by arrows in FIGS. 3 and 4) parallel with the optical axis O.

Figure 2:
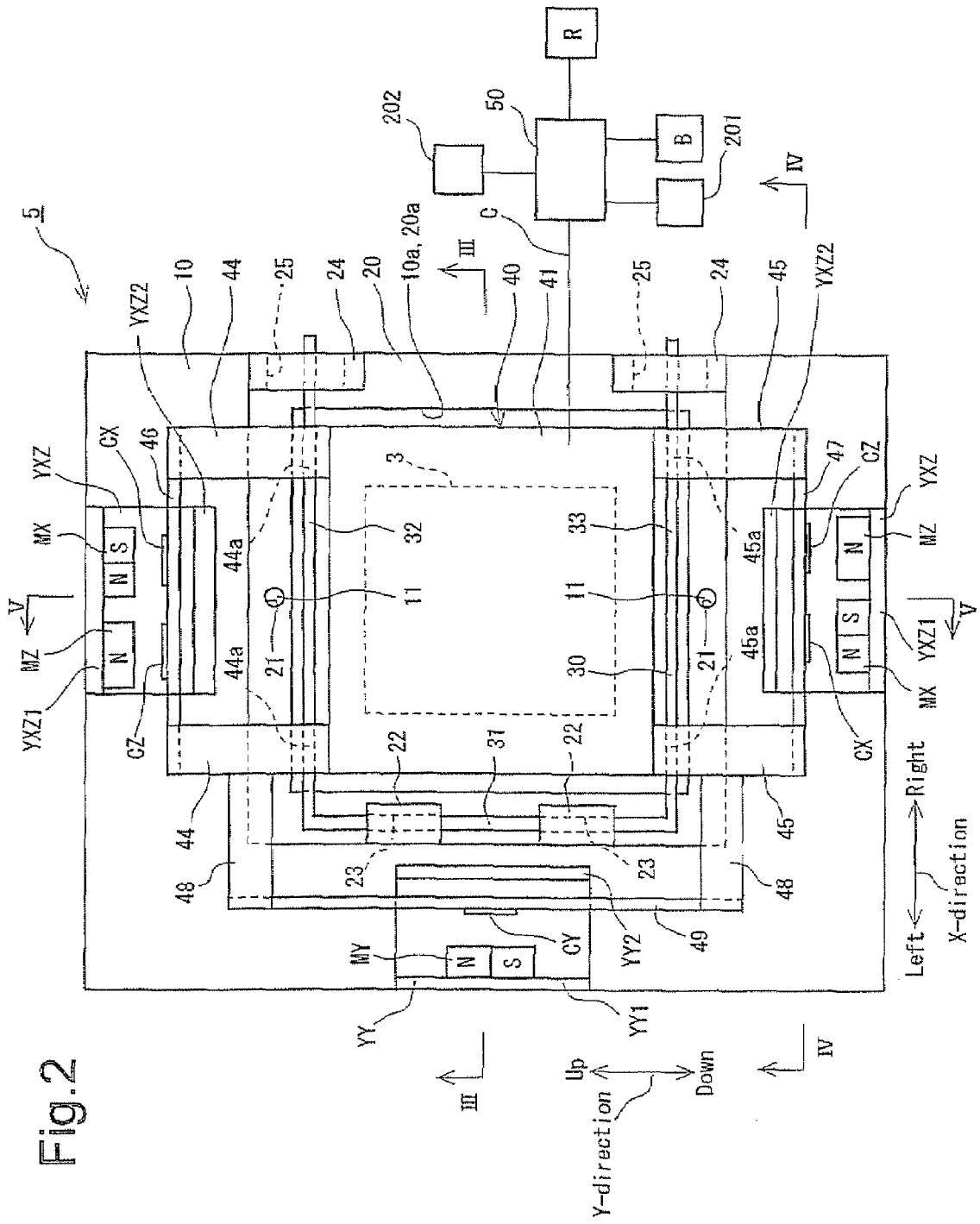
FIG. 2 is a rear view of a CCD drive mechanism.
Figure 5:
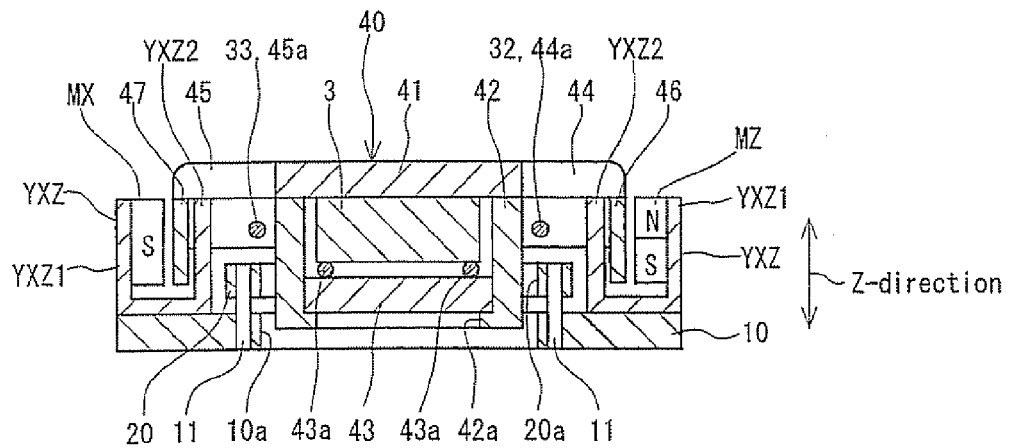
FIG. 5 is a sectional view taken along the line V-V in FIG. 2.
Figure 6:
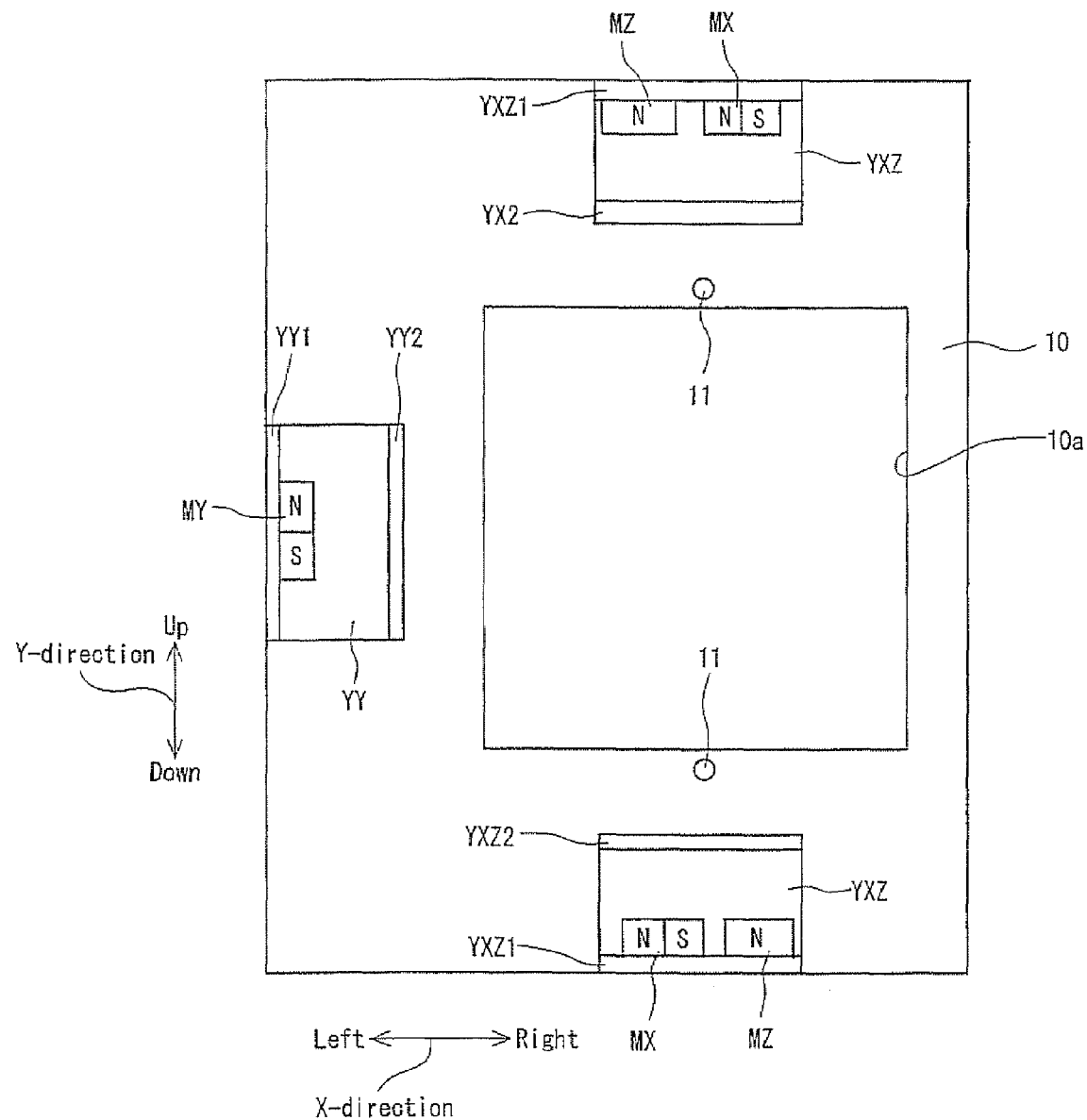
FIG. 6 is a rear view of a stationary support plate.

An upper yoke (magnetic force generating device) YXZ and a lower yoke (magnetic force generating device) YXZ, which are made of a magnetic body such as a metal and have a U-shape in cross section, are secured to upper and lower ends, respectively, of the rear surface of the stationary support plate 10. Magnets MX and MZ (magnetic force generating devices) are secured to a surface of each of upper and lower plate portions YXZ1 of the yokes YXZ so as to oppose respective upper and lower plate portions YXZ2. As shown in FIGS. 2 and 5, the magnets MX and MZ are substantially in the form of a plate positioned parallel with the X and Z directions, respectively. The N-pole and S-pole of the magnet MX are arranged in the X-direction (indicated by arrows in FIGS. 2 and 6, i.e., in the lateral direction) and the N-pole and S-pole of the magnet MZ are arranged in the Z-direction. Magnetic circuits are respectively formed between the magnet MX and the plate portion YXZ2 and between the magnet HZ and the plate portion YXZ2. A yoke (magnetic force generation device) YY made of a magnetic body such as metal, and is substantially identical in shape to the yoke YXZ, is secured to the left end of the rear surface of the stationary support plate 10. The yoke YY is provided with a pair of right and left plate portions YY1 and YY2. The left plate portion YY1 is provided on its inner surface with a magnet (magnetic force generation device) MY of which the N-pole and S-pole are arranged in the Y-direction (indicated by arrows in FIGS. 2 and 6, i.e., upward and downward direction). A magnetic circuit is formed between the magnet MY and the plate portion YY2. The magnet MY is substantially in the form of a plate parallel with the Y and Z directions.

A S-direction moving plate 20 (see FIG. 7) which has a square shape in cross section as viewed from the rear side thereof, and which is smaller than the stationary support plate 10, is provided directly on the stationary support plate 10. The Z-direction moving plate 20 is provided with a receiving hole 20a identical in size and shape as the receiving hole 10a. The Z-direction moving plate 20 is provided with a pair of upper and lower circular guide holes 21 in which the upper and lower S-direction guide rods 11 are slidably inserted. Due to the guide holes 21 being slidable relative to the S-direction guide rods 11 in the Z-direction, the Z-direction moving plate 20 is movable only in the Z-direction relative to the stationary support plate 10.

Figure 7:
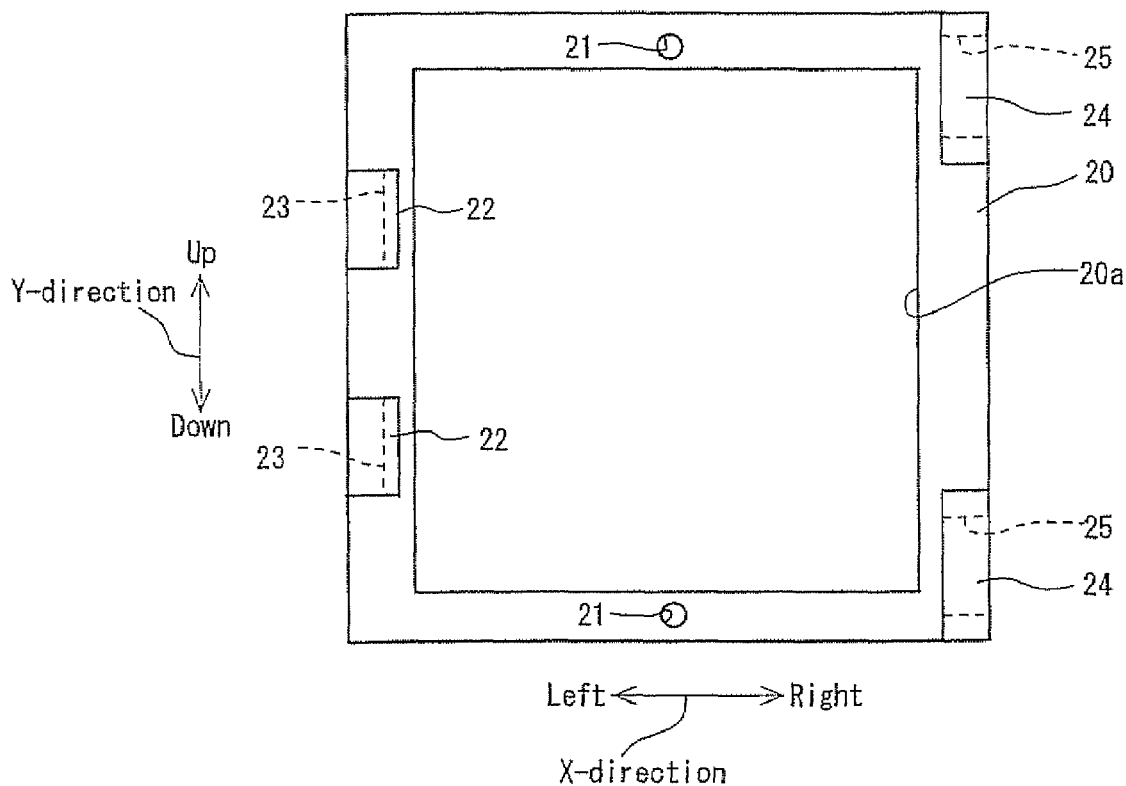
FIG. 7 is a rear view of a Z-direction moving plate.
Figure 12:
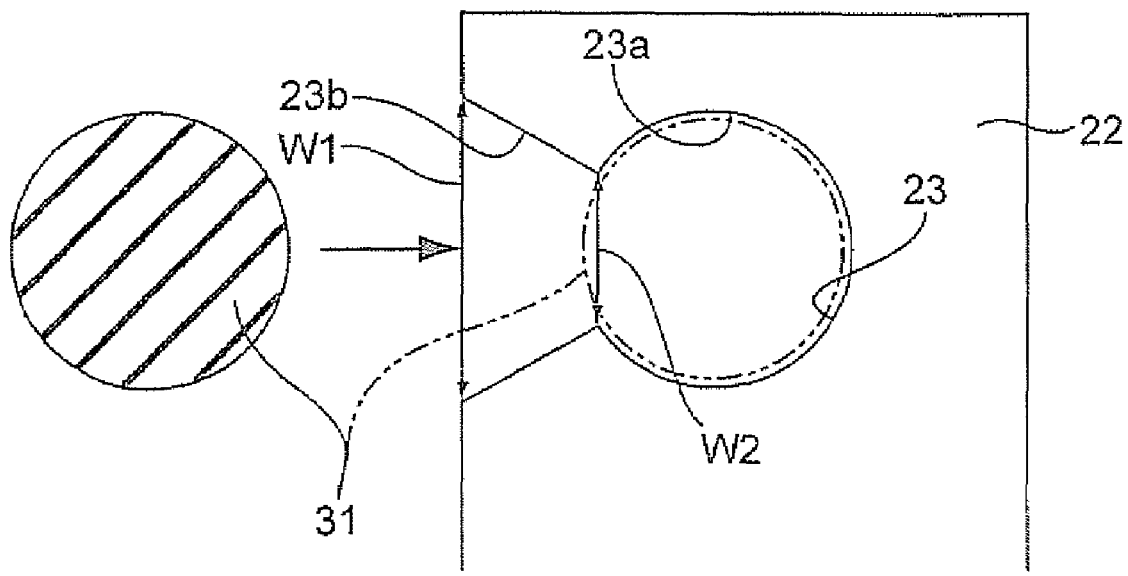
FIG. 12 is an enlarged view of a Y-direction guide portion and a Y-direction moving member wherein the latter is sectioned.

As shown in FIGS. 2 and 7, two identical Y-direction guide portions 22 made of an elastic material such as synthetic resin are provided aligned in the Y-direction on the left side of the rear surface of the Z-direction moving plate 20. The Y-direction guide portions 22 are provided with Y-direction guide grooves 23 linearly extending therethrough. As shown in FIG. 12, the Y-direction guide grooves 23 each have a guide portion 23a having a circular cross section and an opening portion 23b which communicatively connects the circular guide portion 23a to the outside thereof. The guide portions 23a provided in the upper and lower Y-direction guide portions 22 are coaxial, and the outermost opening width (W1) of the opening portions 23b is larger than the innermost opening width (W2) thereof, communicatively connected to the guide portions 23a. The Z-direction moving plate 20 is provided on the right side of the rear surface thereof with two free end supporting portions 24 which are arranged in the Y-direction. The free end supporting portions 24 are provided with Y-direction elongated holes 25 extending therethrough in the X-direction, whose length in the Y-direction is greater than that in the X-direction.

Figure 13:
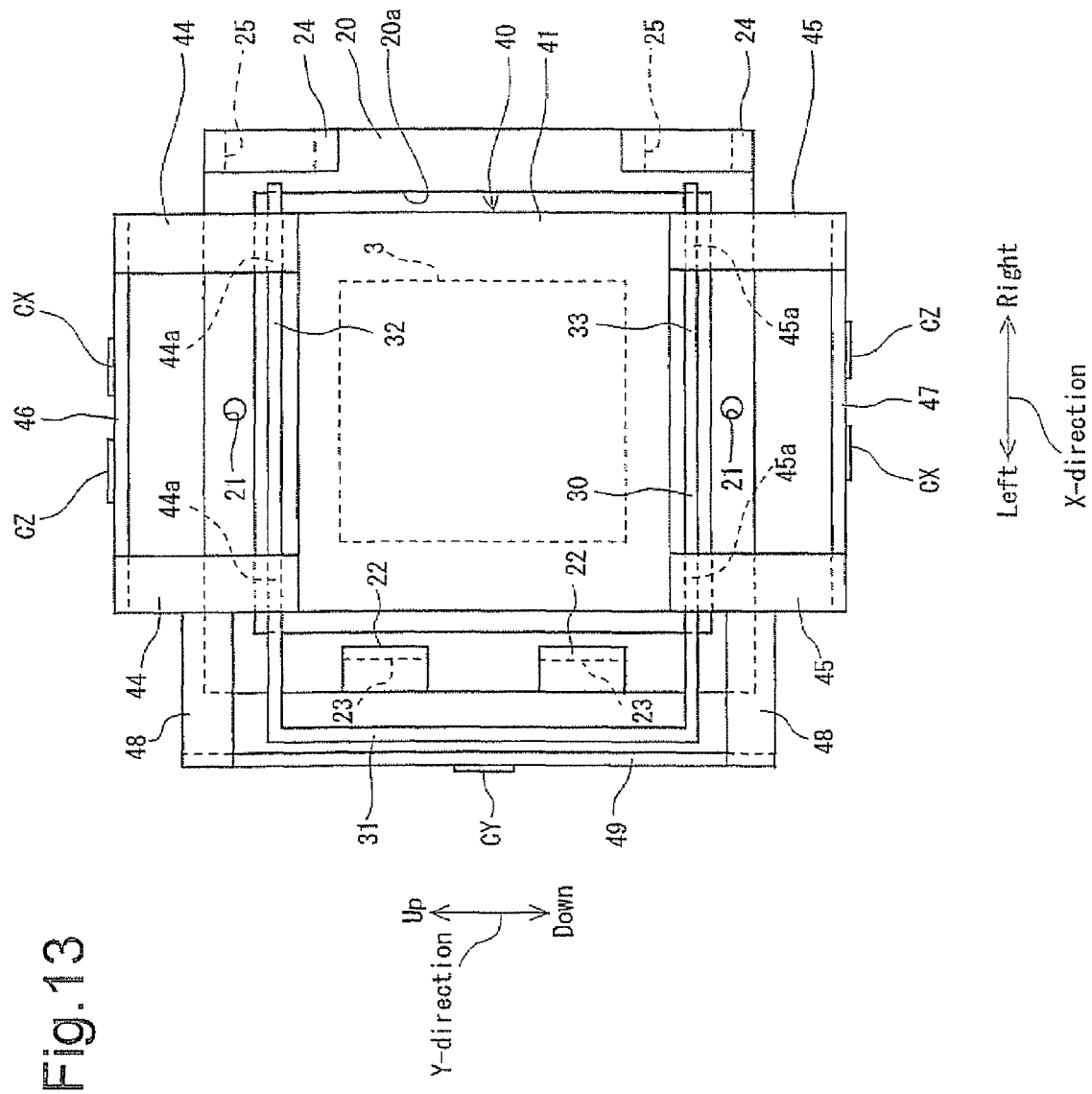
FIG. 13 is a rear view of a Z-direction moving plate, a Y-direction moving member and X-direction moving member, which are being assembled.
Figure 14:
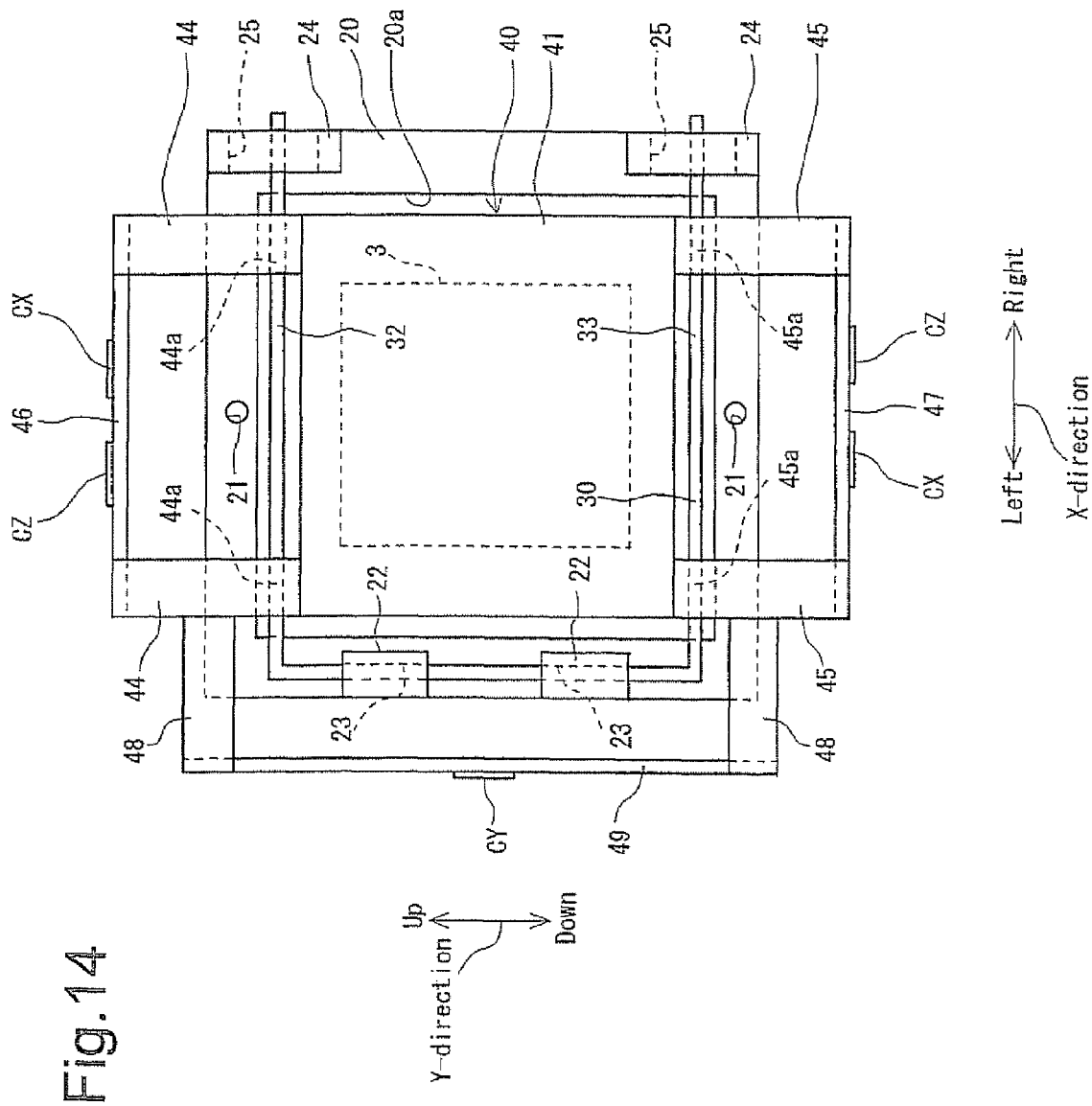
FIG. 14 is a rear view of an assembly of a Z-direction moving plate, a Y-direction moving member and an X-direction moving member.

As can be seen in FIGS. 2, 13, and 14, the Y-direction moving member 30, which is U-shaped as viewed from the rear of the S-direction moving plate 20, is formed by bending a metal bar which is circular in cross section. The Y-direction moving member 30 is provided with a Y-direction bar portion 31 extending in the Y-direction, and X-direction bar portions 32 and 33 which extend from the upper and lower ends of the Y-direction bar portion 31 in the X-direction and in the right direction from the Y-direction bar portion 31 as viewed in, e.g., FIG. 13. The X-direction bar portions 32 and 33 have a cross section diameter substantially identical to the width of the Y-direction elongated hole 25 in the Z-direction.

The X-direction moving member 40 which is supported by the Y-direction moving member 30 so as to move only in the X-direction is constructed as follows.

Figure 3:
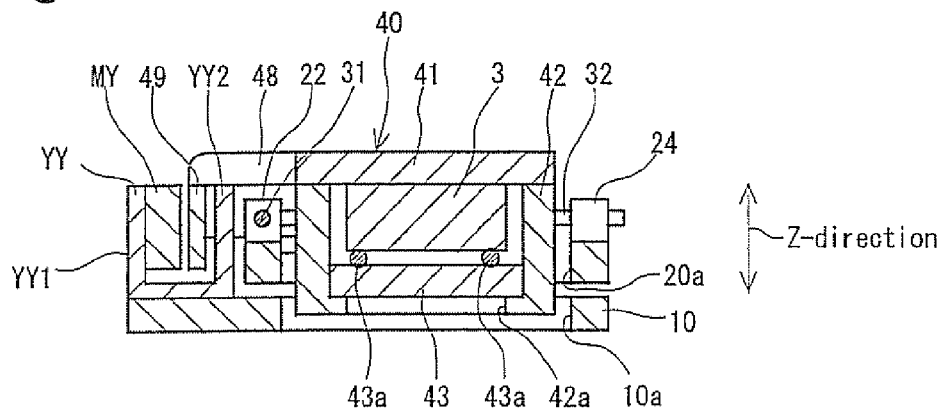
FIG. 3 is a sectional view taken along the line III-III in FIG. 2.
Figure 8:
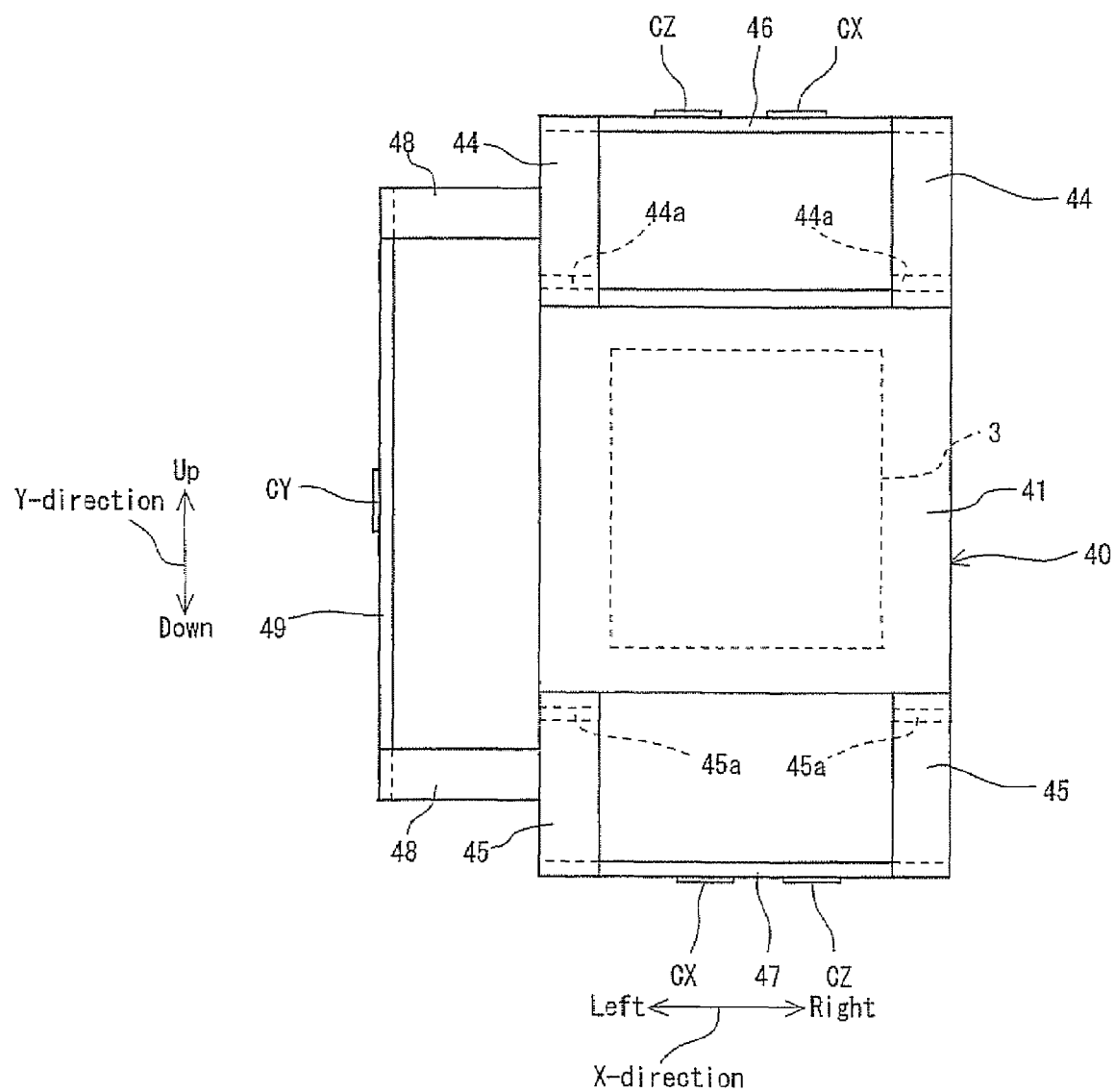
FIG. 8 is a rear view of an X-direction moving member.
Figure 9:
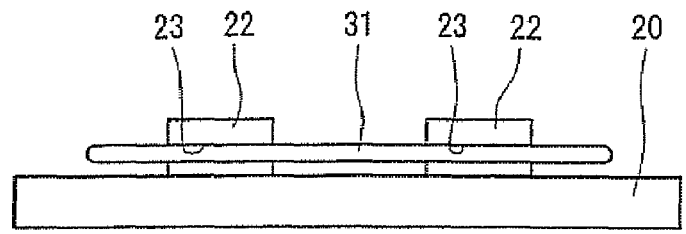
FIG. 9 is a left side view of a Z-direction moving plate and a Y-direction moving member.
Figure 10:
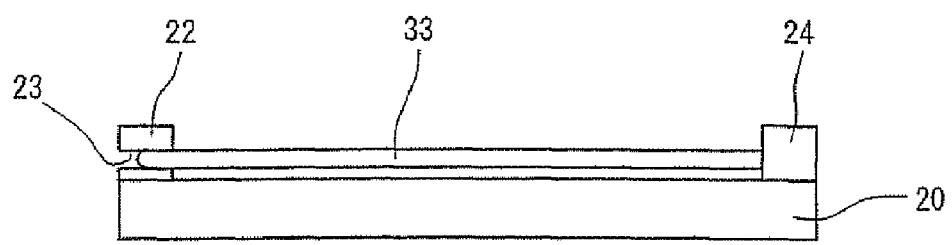
FIG. 10 is bottom view of a Z-direction moving plate and a Y-direction moving member.
Figure 11:
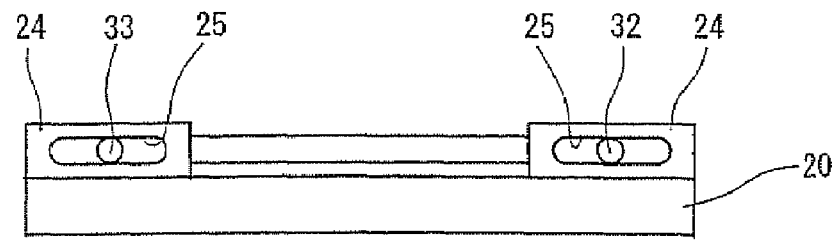
FIG. 11 is a right side view of a Z-direction moving plate and a Y-direction moving member.

As shown in FIGS. 2 and 8, a base plate (common support plate) 41, which is square in shape as viewed from the rear thereof, supports the CCD 3 on the front surface thereof. A hollow cover member 42 located in the receiving holes 10a and 20a is secured to the front surface of the X-direction moving member 40 to surround the CCD 3 (FIGS. 3 and 5). The cover member 42 is provided on the front surface thereof with a light receiving hole 42a which is square-shaped as viewed from the front thereof. The image pickup surface 3a of the CCD 3 is entirely exposed through the light receiving hole 42a. Furthermore, a low-pass filter 43 made of a transparent material is provided within the inside space of the cover member 42 and is in contact with the front wall of the cover member 42. An annular square retainer member 43a which is in contact with the peripheral edge of the image pickup surface 3a is provided between the periphery of the image pickup surface 3a of the CCD 3 and the low-pass filter 43.

Figure 15:
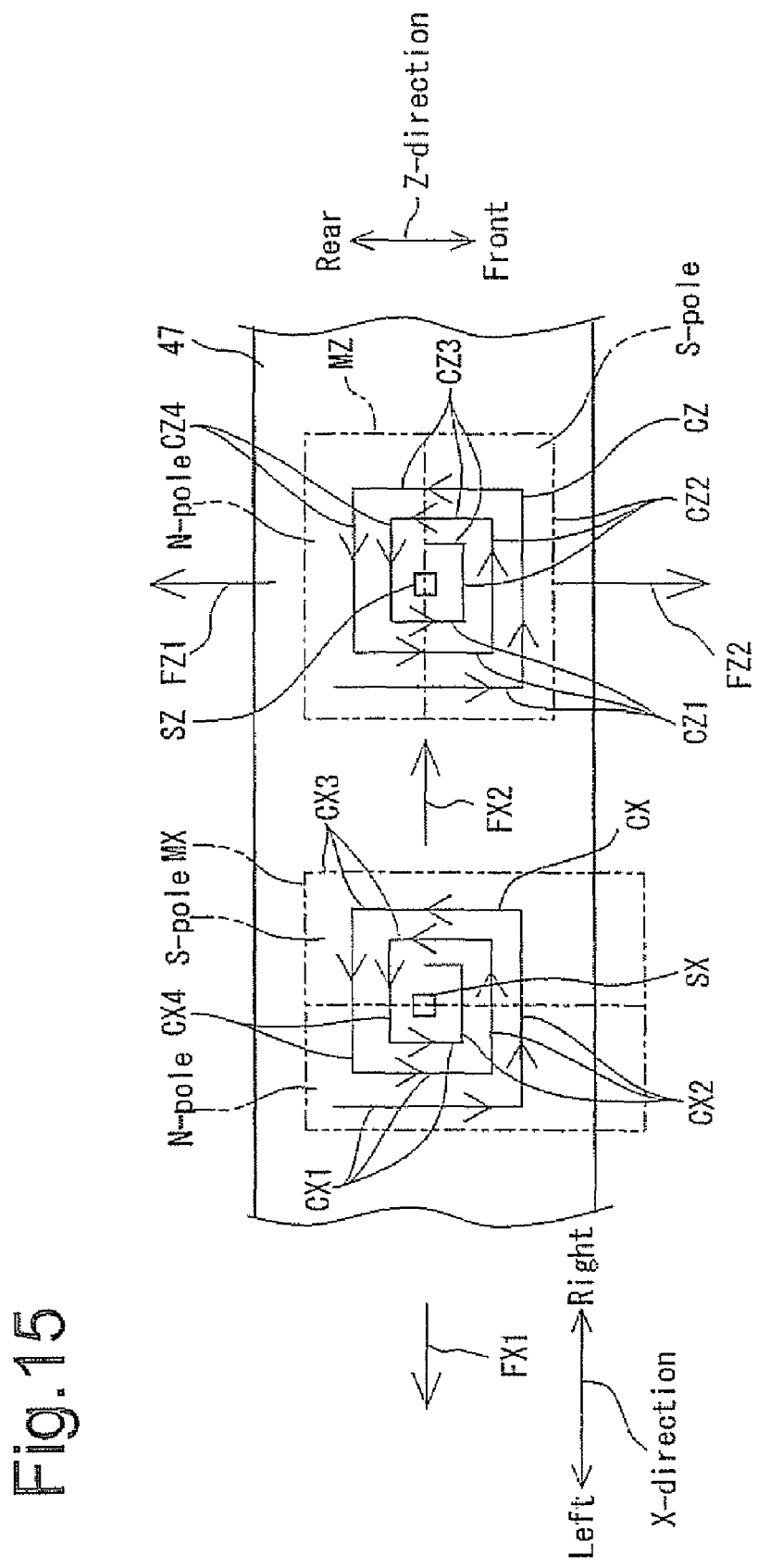
FIG. 15 is an enlarged schematic view of a lower drive device in the X and Z directions.
Figure 16:
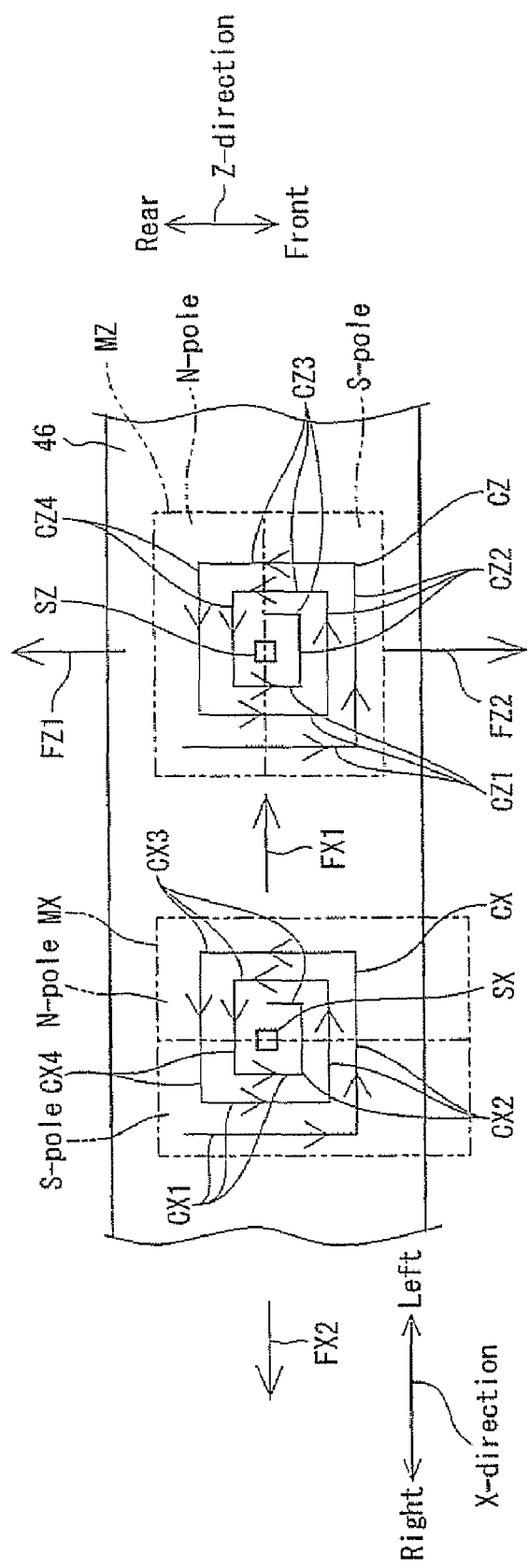
FIG. 16 is an enlarged schematic view of a lower drive device in the X and Z directions.

The base plate 41 is provided on the upper surface thereof with a pair of right and left X-direction guide arms 44 extending in the Y-direction, and on the lower surface thereof with a pair of similar right and left X-direction guide arms which extend in the Y-direction. The X-direction guide arms 44 and 45 are provided with X-direction guide holes 44a and 45a which are substantially identical in cross sectional shape to the X-direction bar portions 32 and 33 and which extend through the X-direction guide arms 44 and 45 in the X-direction (FIG. 5). Moreover, coil support plates (support plates) 46 and 47 parallel with a XZ-plane (plane parallel with the X and Z directions) are provided between the right and left X-direction guide arms 44 and between the right and left X-direction guide arms 45, respectively. As shown in FIGS. 2 and 5, the center portions of the coil support plates 46 and 47 are located in the inner space of the upper and lower yokes YXZ (between the plate portions YXZ1 and YXZ2). As shown in FIGS. 15 and 16, the coil support plates 46 and 47 are provided, on the surface portions thereof opposed to the magnets MX and MZ, with a printed X-direction drive coil (shake correction coil) CX and a printed Z-direction drive coil (AF coil) CZ, respectively. The windings of the X-direction drive coil CX and the Z-direction drive coil CZ lie in a plane parallel with a X-Z plane (optical axis O).

As can be seen in FIGS. 15 and 16, the X-direction drive coils CX provided on the coil support plates 46 and 47 are wound with each side of turns extending linearly as viewed from the magnet MX side. The drive coil CX is defined by left sides CX1, front sides CX2, right sides CX3, and rear sides CX4. Likewise, the drive coil CZ is defined by left sides CZ1, front sides CZ2, right sides CZ3, and rear sides CZ4. Furthermore, the coil support plates 46 and 47 are provided with X-direction position sensor SX and a Z-direction position sensor SZ located at the centers of the coils CX and CZ, respectively. Likewise, the yokes YXZ are provided with sensors (not shown) corresponding to the X-direction position sensor SX and the Z-direction position sensor SZ at positions corresponding thereto.

Figure 4:
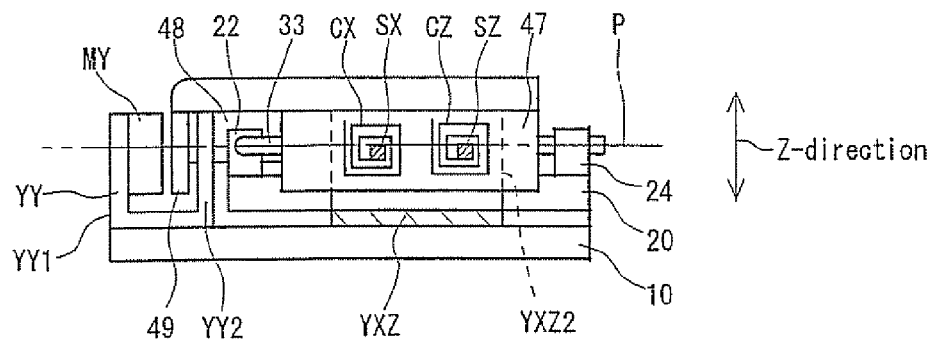
FIG. 4 is a sectional view taken along the line IV-IV in FIG. 2.
Figure 17:
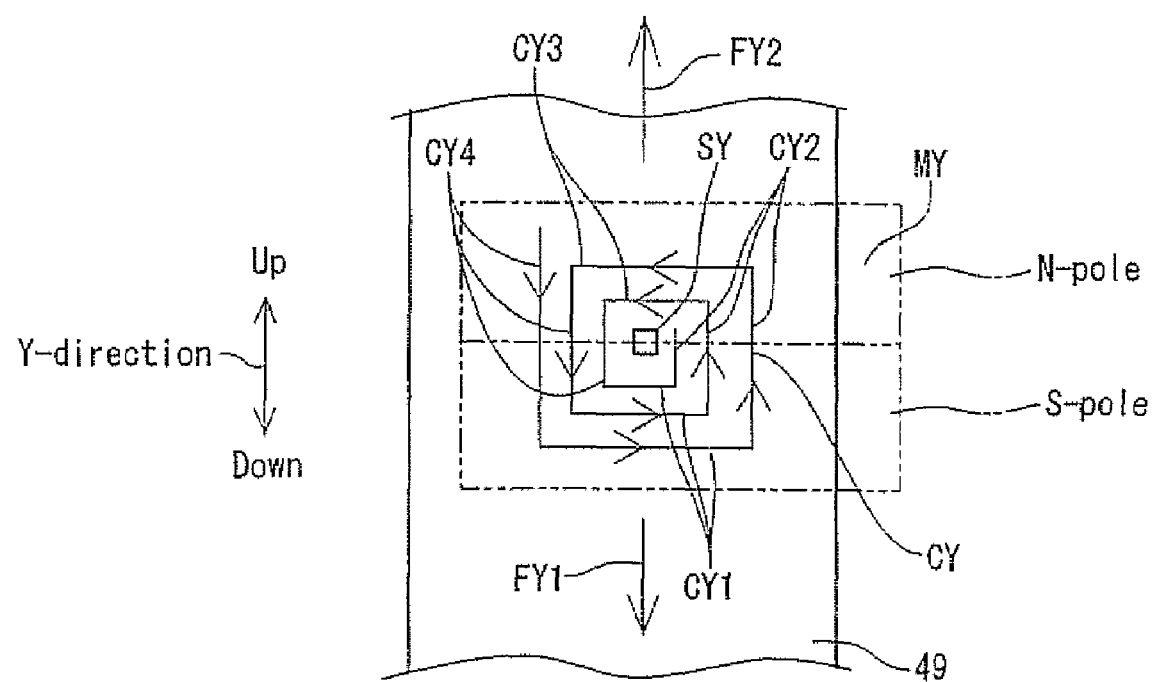
FIG. 17 is an enlarged schematic view of a drive device in the Y-direction.
Figure 18:
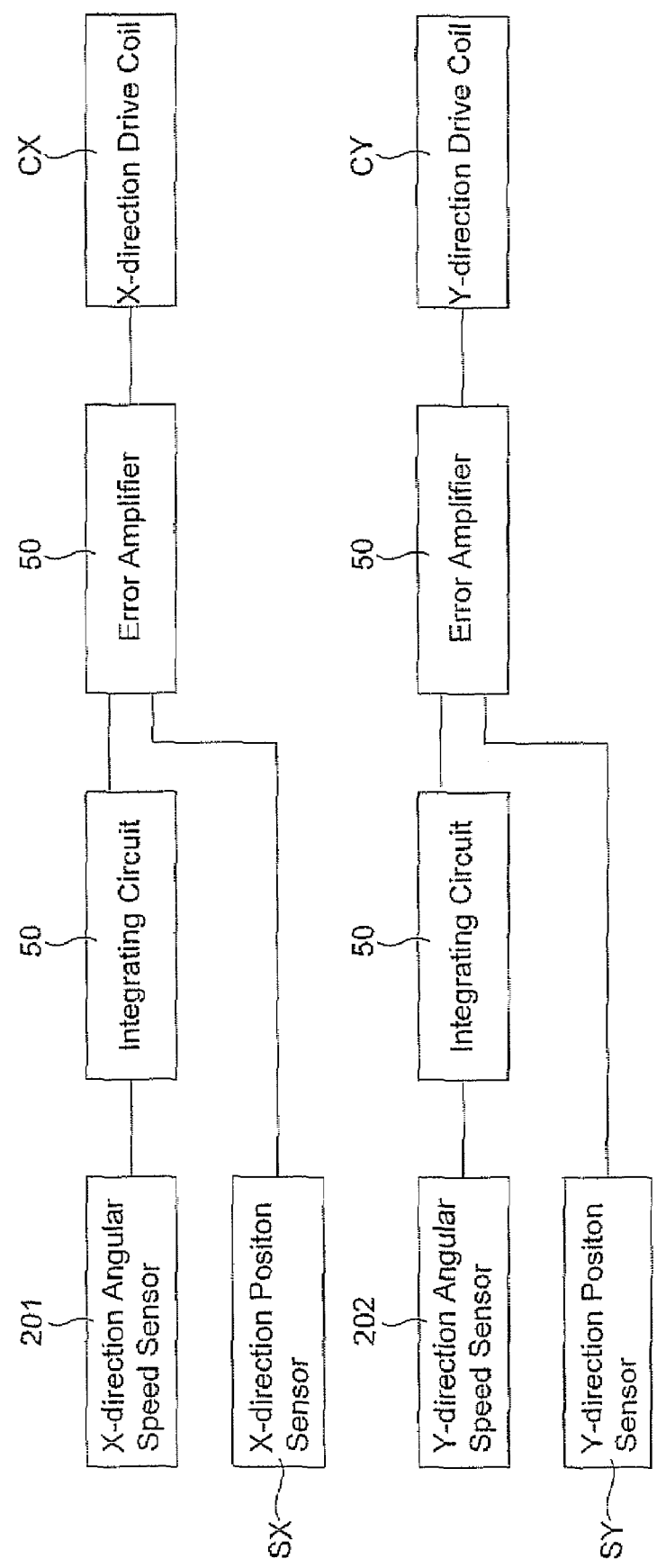
FIG. 18 is a block diagram of a control circuit.

The support arms 48 extend leftward from the left X-direction guide arm 44 and X-direction guide arm 45. A coil support plate (support plate) 49 parallel with the YZ plane (plane parallel with the directions Y and Z) is detachably provided between the upper and lower support arms 48. As shown in FIGS. 2, 3 and 4, the central portion of the coil support plate 49 is located within the inner space of the yoke YY (between the plate portions YY1 and YY2). As shown in FIG. 17, the coil support plate 49 is provided with a printed Y-direction drive coil (camera shake correction coil ) CY whose winding extends in parallel with the YZ plane (optical axis O), a t a position opposed to the magnet MY.

As shown in FIG. 17, the Y-direction drive coil CY is wound with each side of turns extending linearly as viewed from the magnet MY side. The drive coil CY is defined by left sides CY1, front sides CY2, right sides CY3, and rear sides CY4. Furthermore, the coil support plate 49 is provided with a Y-direction position sensor SY located at the center of the Y-direction drive coil CY. Likewise, the yoke YY is provided with a sensor (not shown) corresponding to the Y-direction position sensor SY at a position corresponding thereto.

The X-direction drive coil CX, the Y-direction drive coil CY and the Z-direction drive coil CZ are wound by several turns in the drawings for clarity, however, the number of the turns in practice is several dozen.

Moreover, the Z-direction moving plate 20, the Y-direction moving plate 30, the X-direction moving plate 40 and the X-direction moving member 40 constitute a movable unit (movable member) of the CCD drive mechanism 5.

The stationary support plate 10, the Z-direction moving plate 20, the Y-direction moving member 30 and the X-direction moving member 40 are assembled to form a single unit according to the following description. The assembling process will be discussed below with reference to FIGS. 13 and 14.

Firstly, in a state where the coil support plate 49 of the X-direction moving member 40 is detached from the upper and lower support arms 48, the cover member 42 of the X-direction moving member 40 is positioned into the receiving hole 20a of the Z-direction moving plate 20, and the X-direction guide holes 44a of the X-direction guide arms 44, the X-direction guide holes 45a of the X-direction guide arms 45, the Y-direction guide grooves 23 and the Y-direction elongated holes 25 are positioned into the same plane parallel with the X and Y directions. In this state, the Y-direction moving member 30 is moved close to the X-direction moving plate 40 from the left side thereof, the X-direction bar portions 32 and 33 are inserted into the X-direction guide holes 44a of the X-direction guide arms 44 and the X-direction guide holes 45a of the X-direction guide arms 45, respectively, and the upper and lower Y-direction elongated holes 25, and the Y-direction bar portion 31 is fitted in the upper and lower opening portions 23b of the Y-direction guide grooves 23. When the Y-direction bar portion 31 is fitted in the opening portions 23b, the diameter of the Y-direction bar portion 31 is smaller than the outermost opening width W1 of the opening portion 23b but is larger than the innermost opening width W2 of the opening portion 23b. Accordingly, the opening portions 23b are elastically deformed to increase the opening width thereof upon further movement of the Y-direction bar portion 31 toward the right direction (as viewed in FIG. 13) so that the Y-direction bar portion 31 is fitted and held in the guide portions 23a. Consequently, the opening portions 23b are elastically returned to their original shape, so that the Z-direction moving plate 20, the Y-direction moving member 30, and the X-direction moving member 40 become a single unit (assembly). Thereafter, the coil support plate 49 is fitted to the upper and lower support arms 48 (FIG. 14).

As can be understood from the above description, the Y-direction moving member 30 can be easily attached to the Y-direction elongated holes 25 and the Y-direction guide grooves 23 by only linearly moving the Y-direction moving member 30 in the right direction (with respect to FIGS. 13 and 14). Note that the Y-direction moving member 30 can be easily detached from the Y-direction guide grooves 23 and the Y-direction elongated holes 25, by only linearly moving the Y-direction moving member 30 in the left direction with a force large enough to elastically deform the opening portions 23b.

After the Z-direction moving member 20, the Y-direction moving member 30, and the X-direction moving member 40 are assembled together, the assembly is moved close to the stationary support plate 10 from behind and the Z-direction guide bars 11 are inserted in the upper and lower guide holes 21. Consequently, the stationary support plate 10 r the Z-direction moving member 20, the Y-direction moving member 30, and the X-direction moving member 40 become a single unit.

The stationary support plate 10 extends parallel with the X-Y plane (plane parallel with the X and Y directions) and the Z-direction moving plate 20 is always parallel with the stationary support plate 10. Furthermore, since the Y-direction bar portion 31 is supported by the Y-direction guide grooves 23 and the diameter of the X-direction bar portions 32 and 33 is identical to the length of the Y-direction elongated holes 25 in the Z-direction (forward and rearward direction), no rotation of the Y-direction moving member 30 about the Y-direction bar portion 31 occurs. The central axis of the Y-direction moving member 30 is always located on an imaginary plane P (FIG. 4) parallel with the X and Y directions.

As can be seen in FIG. 2, a memory R and a battery B are electrically connected to the CPU (central processing unit/ controller) 50 provided in the digital camera 1. Furthermore, the X-direction position sensor SX, the Y-direction position sensor SY and the Z-direction position sensor SZ and their corresponding sensors (not shown) are connected to the CPU 50. The base plate 41 is provided on its front surface with a printed conductor pattern (not shown) to which conductors are connected to the CCD 3 and extend to the X-direction guide arms 44 and 45, and the support arms 48, to be connected to the coils CX, CY and CZ. The conductors and the CPU 50 are electrically connected to each other through a flexible printed circuit board (FIG. 2) C. An X-direction angular speed sensor (camera shake detection sensor) 201 for detecting the angular movement of the photographing lens optical axis O in the X-direction, and a Y-direction angular speed sensor (camera shake detection sensor) 202 for detecting the angular movement of the photographing lens optical axis O in the Y-direction are provided in the digital camera 1 ( FIGS. 2 and 18). The X-direction angular speed sensor 201 and the Y-direction angular speed sensor 202 are electrically connected to the CPU 50.

The AF function and the camera shake correcting function performed by the operation of the CCD drive mechanism 5 will be discussed below.

First, the AF function will be explained. If a shutter button (not shown) of the digital camera 1 is depressed by a half step while an object image transmitted through the lenses L1, L2 and L3, the light receiving hole 42*a*, and the low-pass filter 43, of the digital camera 1 is picked-up by the CCD 3, the CPU 50 supplies the electric current generated by the battery B to the Z-direction drive coil CZ.

Assuming that the current in the direction indicated by arrows in FIGS. 15 and 16 is supplied to the Z-direction drive coil CZ, to which the magnetic force is supplied from the magnetic circuit defined between the magnet MZ and the plate portion YXZ2 of the Yoke YXZ, a forward force FZ2 is generated in the front sides CZ2 and the rear sides CZ4, so that the Z-direction moving plate 20 integral with the Z-direction drive coil CZ is moved forward along the Z-direction guide rods 11. Although the forces are also generated in the left sides CZ1 and the right sides CZ3, the forces are identical in magnitude but opposite in direction, and hence, these forces are cancelled out.

If current in a direction opposite to the direction indicated by an arrow in FIGS. 15 and 16 flows in the Z-direction drive coil CZ, rearward forces in the direction FZ1 are generated in the front sides CZ2 and the rear sides CZ4, so that the Z-direction moving plate 20 integral with the Z-direction drive coil CZ is moved rearward along the Z-direction guide rods 11. Likewise in this case, although the forces are also generated in the left sides CZ1 and the right sides CZ3, the forces are identical in magnitude but opposite in direction, and hence, the forces are cancelled out. In either current flow directions, the magnitude of the forces FZ1 and FZ2 is proportional to the current (forces FZ1 and FZ2 increase as the current increases and vice versa), and the Z-direction moving plate 20 is stopped as soon as no current is supplied to the Z-direction drive coil CZ.

As can be understood from the above description, the CCD 3 is moved in the optical axis direction (Z-direction) together with the Z-direction moving plate 20 by controlling the direction of the current supplied to the Z-direction drive coil CZ through the CPU 50, provided that the front sides CZ2 and rear sides CZ4 of the Z-direction drive coils CZ of the upper and lower coil support plates 46 and 47 maintain a predetermined positional relationship with the S-pole and N-pole in the upward and downward direction (within the range where the front sides CZ2 and rear sides CZ4 of the Z-direction drive coils CZ of the upper and lower coil support plates 46 and 47 superimpose the S-pole and N-pole, respectively, as viewed in upward-downward direction).

When the CCD 3 is moved in the optical axis direction, the contrast of the object image picked-up by the CCD 3 is varied accordingly, and the Z-direction position sensor SZ and its corresponding sensor always detect the axial position of the CCD 3. All of the detected position data are stored in the memory R. The CPU 50 compares the waveforms based on the contrasts of all the images and determines that the axial position of the CCD 3, at which an object image having the largest change in the waveform is picked up, is an in-focus position. The CPU 50 supplies the Z-direction drive coil CZ with electric current, based on the position data stored in the memory X, so that the CCD 3 is moved to the in-focus position. When the CCD 3 is moved to the in-focus position, the CCD 3 is maintained in that position. Thus, the AF operation is completed.

Note that a part of the front sides CZ2 and a part of the rear sides CZ4 of the 2-direction drive coils CZ of the coil support plate 46 and the coil support plate 47 are always opposed to the S-polarity and the N-polarity of each magnet MZ, respectively, as viewed in upward-downward direction, even if the movement in the X and Y directions occurs due to a camera shake correction which will be discussed hereinafter. Such a positional relationship between the Z-direction drive coils CZ and the magnets MZ in upward-downward direction (left/right direction as shown in FIG. 5) is referred as "superimposed relationship in the upward/downward direction" hereinafter.

The camera shake correcting function of the CCD drive mechanism 5 will be discussed below.

First, the operation of the CCD drive mechanism 5 when current is supplied to the X-direction drive coil CX and the Y-direction drive coil CY will be explained.

The cover member 42 (CCD 3) is movable in the X-direction in a range in which the left sides CX1 and right sides CX3 of the X-direction drive coil CX on the coil support plate 46 maintain a superimposed relationship in the upward/downward direction with the S-pole and N-pole of the magnet MX, and likewise, the left sides CX1 and right sides CX3 of the n-direction drive coil CX on the coil support plate 47 maintain a superimposed relationship in the upward/downward direction with the N-pole and S-pole of the magnet MX, and the cover member 42 does not abut against the receiving holes 10*a* and 20*a*.

If the current flows in the direction indicated by arrows in FIGS. 15 and 16, for example, in the X-direction drive coils CX of the coils support plates 46 and 47 in an inoperative position, in which the center of the image pickup surface 3*a* of the CCD 3 is located on the optical axis O, the linear forces FX2 in the X-direction in the right direction are generated in the left sides CX1 and the right sides CX3. Due to the forces FX2, the X-direction moving member 40 is moved in the right direction along the X-direction bar portions 32 and 33. As a result, the CCD 3 is also moved in the right direction relative to the stationary support plate 10. Note that forces are generated also in the front sides CX2 and the rear sides CX4, however, since the forces are cancelled out, no force is applied to the X-direction moving member 40.

If a current flows in a direction opposite to the direction indicated by the arrows in FIGS. 15 and 16 in the X-direction drive coils CX of the coil support plates 46 and 47, linear forces FX1 in the X-direction in the left direction are generated in the left sides CX1 and the right sides CX3, so that the X-direction moving member 40 is moved in the left direction along the X-direction bar portions 32 and 33 relative to the stationary support plate 10.

As can be understood from the above description, the CCD 3 is moved in the X-direction (lateral direction) along the X-direction bar portions 32 and 33 by controlling the direction of the current to be supplied to the X-direction drive coil through the CPU 50. As soon as supply of current to the X-direction drive coil CX from the battery B is interrupted, no power in the X-direction is supplied, and hence, the X-direction moving member 40 (CCD 3) is stopped. The magnitude of the current supplied to the X-direction drive coil CX and the force generated thereby are proportional, and hence, the force exerted on the X-direction drive coil CX increases as the current supplied from the battery B to the X-direction drive coil CX increases, and vice versa.

The cover member 42 (CCD 3) is movable in the Y-direction within a range in which the upper sides CY3 and lower sides CY1 of the Y-direction drive coil CY have a superimposed relationship with the N-pole and the S-pole of the magnet MY in the right/left direction, respectively, and in which the cover member 42 does not abut against the receiving holes 10*a* and 20*a*.

In an inoperative position, if the current in the direction indicated by the arrows in FIG. 17 is supplied to, for example, the Y-direction drive coil CY, linear forces FY1 in the Y-direction and in the downward direction are generated in the upper sides CY3 and the lower sides CY1. Due to the forces FY1, the Y-direction moving member 30 is moved downward along the Y-direction guide grooves 23 and the Y-direction elongated holes 25 relative to the stationary support plate 10, and the X-direction moving member 40 is relatively moved downward together with the Y-direction moving member 30. Note that forces are generated in the rear sides CY2 and the front sides CY4, however, the forces are cancelled out, and accordingly, no force is applied to the Y-direction moving member 30.

If the current in a direction opposite to the direction indicated by arrows in FIG. 17 is supplied to the Y-direction drive coil CY, linear forces FY2 in the Y-direction in the upward direction are generated in the upper sides CY3 and the lower sides CY1, so that the Y-direction moving member 30 is moved upward along the Y-direction guide grooves 23 and the Y-direction elongated holes 25, relative to the stationary support plate 10.

As can be understood from the above description, the CCD 3 is moved in the Y-direction (upward and downward direction) along the Y-direction guide grooves 23 and the Y-direction elongated holes 25 within a range in which the lower sides CY1 and the upper sides CY3 of the Y-direction drive coil CY maintain a superimposed relationship in the left/right direction with the S-pole and the N-pole of the magnet MY, respectively, and in which the cover member 42 does not abut against the receiving holes 10a and 20a, by controlling the direction of the current supplied to the Y-direction drive coil CY through the CPU 50. Moreover, as soon as supply of current from the battery B to the Y-direction drive coil CY is interrupted, no force in the Y-direction is generated so that the movement of the Y-direction moving member 30 (CCD 3) is stopped.

The magnitude of the current supplied to the Y-direction drive coil CY and the force generated thereby are proportional, and hence, the force exerted on the Y-direction drive coil CY increases as the current supplied from the battery B to the Y-direction drive coil CY increases, and vice versa.

The left sides CX1 and the right sides CX3 of the X-drive coil CX on the coil support plate 46 side always superimpose the S-pole and N-pole of each magnet MX in the upward and downward direction even if the X-direction moving member 40 is moved in the Z and Y directions, and the left sides CX1 and the right sides CX3 of the X-direction moving member CX on the coil support plate 47 side always superimpose the N-pole and the S-pole of each magnet MX in the upward/downward direction, even if the X-direction moving member 40 is moved in the Z and Y directions.

The lower sides CY1 and the upper sides CY3 of the Y-direction drive coil CY always superimpose the S-pole and N-pole of the magnet M in the lateral (left/right) direction even if the X-direction moving member 40 is moved in the X and Z directions.

When a photographing operation is performed while a camera shake correction switch (not shown) of the digital camera 1 having the CCD drive mechanism 5 is turned ON, if no camera shake (no movement of image) occurs, the X-direction angular speed sensor 201 and the Y-direction angular speed sensor 202 detect no camera shake (vibration), and hence, the CCD drive mechanism 5 is maintained in an inoperative position shown in FIGS. 2 to 5 in which the axis of the image pickup surface 3a of the CCD 3 is located on the optical axis O.

If a camera shake of the digital camera 1 occurs, the camera shake correcting operation is carried out to cancel the movement of the image due to the angular movement of the optical axis O of the photographing lens caused by the camera shake. The camera shake correcting operation will be discussed below with reference to a block diagram shown in FIG. 18.

If the X-direction angular speed sensor 201 and the Y-direction angular speed sensor 202 detect a camera shake, the CPU 50 serves as an integrating circuit which integrates the output of the X-direction angular speed sensor (camera shake detection sensor) 201 and the output of the Y-direction angular speed sensor (camera shake detection sensor) 202 and calculates the angular displacement of the optical axis O in the X and Y directions. Consequently, the CPU 50 serves as an error amplifier in which the output (amount of camera shake of the digital camera 1) of the CPU (integrating circuit) 50 and the output (displacement of the CCD 3) of X-direction position sensor SX are compared with each other in the CPU (error amplifier) 50. A voltage corresponding to a difference between these outputs is applied to the X-direction drive coil CX through the CPU (error amplifier) 50, so that the CCD 3 is linearly moved in the X-direction to reduce the output difference.

Likewise, the output of the CPU (integrating circuit) 50 and the output of the Y-direction position sensor SY are compared in the CPU (error amplifier) 50, so that a voltage corresponding to the output difference is applied to the Y-direction drive coil CY through the CPU (error amplifier) 50. As a result, the CCD 3 is linearly moved in the Y-direction.

Namely, the CCD 3 is moved in the X and Y directions in accordance with the angular displacement of the optical axis O due to the camera shake to correct the movement of the image on the CCD 3.

If the camera shake correction switch is turned OFF, the CPU 50 supplies the current to the X-direction drive coil CX and the Y-direction drive coil CY so that the CCD 3 is moved to the initial position of the CCD 3 (in which the center of the image pickup surface 3a is located on the optical axis O) stored in the memory R through the X-direction position sensor SX and the Y-direction position sensor SY and the corresponding sensors. When the CCD 3 is returned to the initial position, the CPU 50 stops the CCD 3 at the initial position.

According to the present invention, since the X-direction drive coil CX, the Y-direction drive coil CY, and the Z-direction drive coil CZ are all planar coils in which the windings lie in a plane parallel with the optical axis O, the accommodation space in the camera body can be reduced in comparison with the conventional voice coil. Moreover, in the illustrated embodiment, since the X-direction drive coil CX, the Y-direction drive coil CY, the Z-direction drive coil CZ are arranged in an effective space around the CCD 3, the digital camera 1 can be miniaturized.

Furthermore, if a motion picture is displayed in a display (not shown) of the digital camera 1, the camera shake correction during zooming of the motion picture is carried out while focusing. In the illustrated embodiment, since the AF operation is performed using the magnetic drive mechanism (CCD drive mechanism 5), the AF control (camera shake correction control) is able to keep up with the camera shake correction during zooming of the motion picture.

If the number of turns of the windings of the drive coils CX, CY and CZ is increased to increase the drive force in the directions X, Y and Z to thereby perform the AF operation or the camera shake correction at high speed, there is no change in the size of the X-direction drive coil CX and the Z-direction drive coil CZ in the upward and downward direction and the size of the Y-direction drive coil CY in the right and left direction. Moreover, it is not necessary to increase the size of the yoke YXZ in the upward and downward direction and the size of the yoke YY in the right and left direction. Therefore, no increase in the size of the digital camera 1 is necessary unlike a digital camera in which a voice coil is used.

Furthermore, since the Z-direction drive coils CZ which constitute the AF coils and the X-direction drive coils CX which constitute the camera shake correcting coils are arranged in the same plane of the same substrates 46 and 47, (since the substrates 46 and 47 are commonly used), the CCD drive mechanism 5 can be made considerably compact.

Since the coils CX, CY and CZ provided on the X-direction drive member 40, having thereon the CCD 3, are very thin and extremely light, in comparison with voice coils which are heavy, the speed of the AF operation and the camera shake correction can be easily increased, and furthermore, the CCD 3 can be operated at a low power.

Moreover, since the coils CX, CY and CZ and the yokes YXZ, YY are simple in shape, the manufacturing cost thereof is lower than that of a voice coil.

Figure 19:
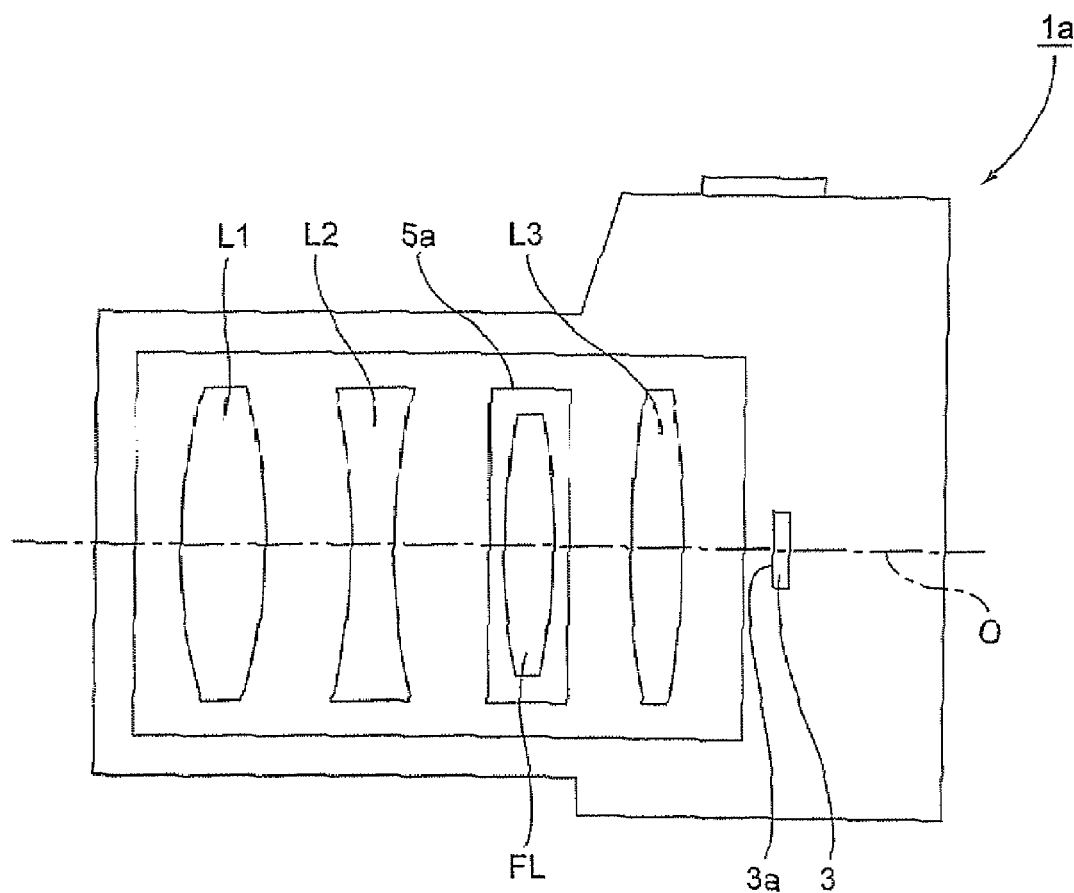
FIG. 19 is a longitudinal sectional view of a digital camera having a magnetic drive mechanism incorporated therein for driving a focusing lens, according to a modified embodiment of the present invention.

Although the AF operation is carried out by moving the CCD 3 in the optical axis direction O, in the illustrated embodiment, it is possible to provided a magnetic drive mechanism 5a having a focusing lens FL fitted and secured therein, wherein the focusing lens FL is arranged between the lens L1 and the lens L2 or between the lens L2 and the lens L3 (shown only between the lens L2 and the lens L3 in FIG. 19), and the CCD 3 is secured to the camera body of the digital camera 1a behind the lens L3 as shown in FIG. 19. In this alternative, the AF operation can be carried out by moving the focusing lens FL in the optical axis direction O.

Figure 20:
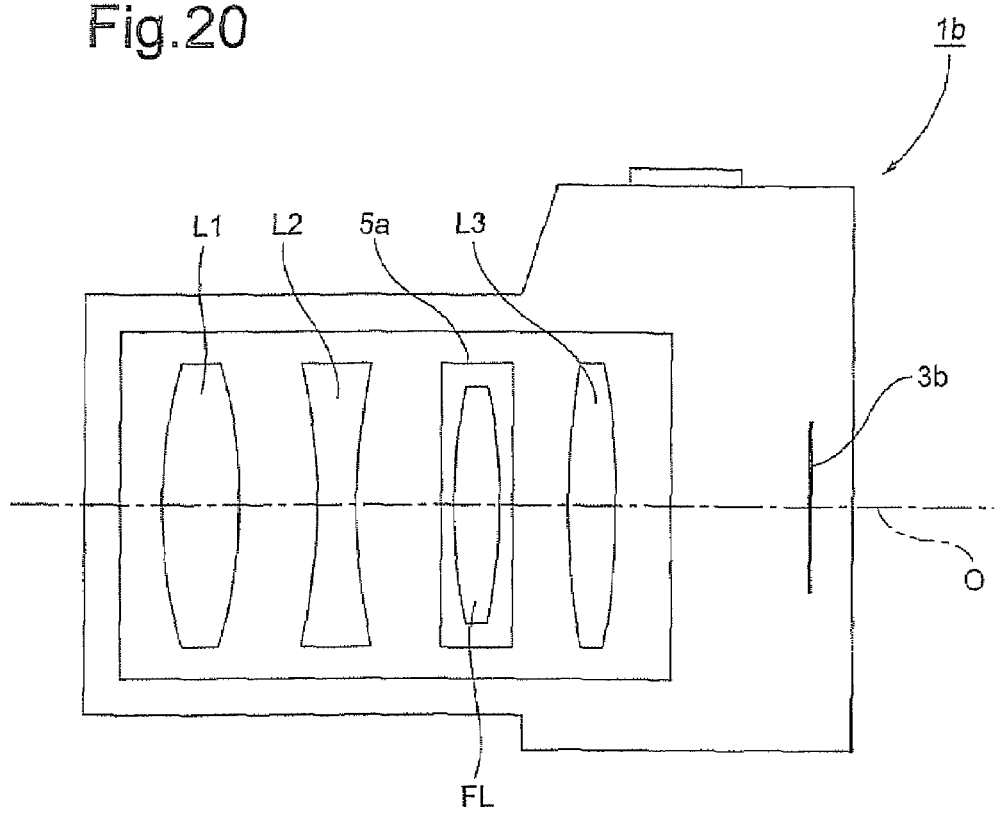
FIG. 20 is a longitudinal sectional view of a silver salt film camera having a magnetic drive mechanism incorporated therein for driving a focusing lens, according to another modified embodiment of the present invention.

Furthermore, in a silver salt camera 1b of an alternative embodiment shown in FIG. 20, it is possible to carry out the AF operation by moving the focusing lens FL. In this case, a film 3b, having on its front surface a photosensitive surface (film surface), is provided behind the lens L3 instead of the CCD 3, and the focal position can be detected by a passive autofocusing system or an active autofocusing system, wherein the focusing lens is moved in the optical axis direction until the photographing lens is in focus.

Figure 21:
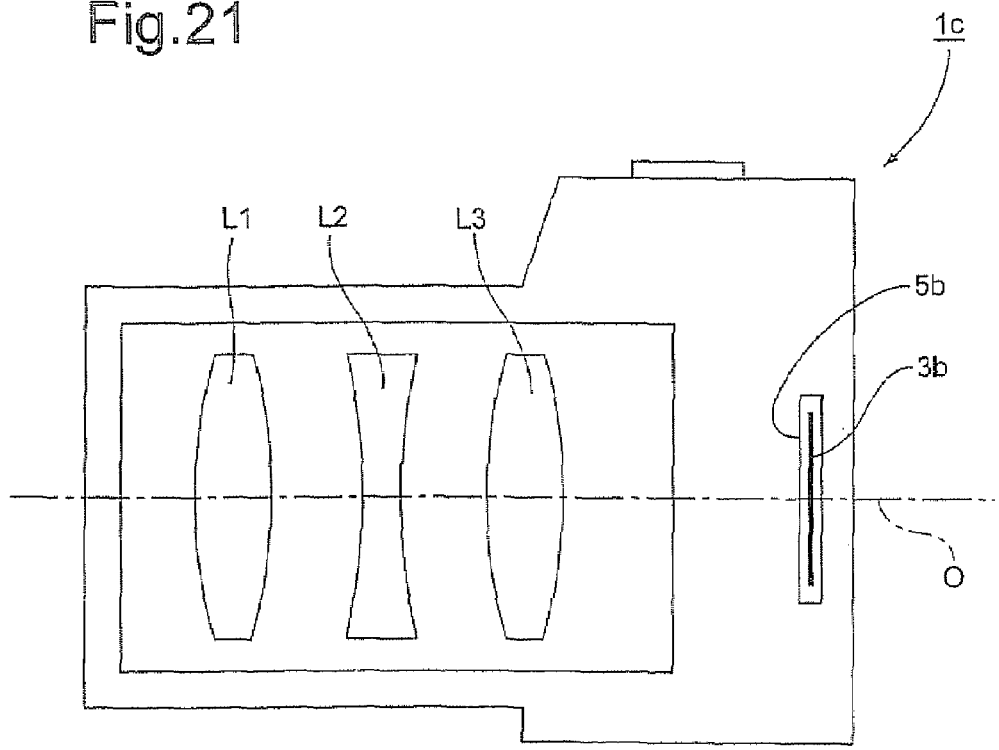
FIG. 21 is a longitudinal section view of a silver salt film camera having a magnetic drive mechanism incorporated therein for driving a film, according to another modified embodiment of the present invention.

In a silver salt camera 1c of an alternative embodiment shown in FIG. 21, a film 3b, having on its front surface a photosensitive surface (film surface), can be supported by a magnetic drive mechanism 5c, and the focal position can be detected by a passive autofocusing system or an active autofocusing system, wherein the film is moved in the optical axis direction by the magnetic driving mechanism 5b to an in-focus position thus obtained.

It is possible to use the focusing lens FL as a correction lens which is linearly moved in the X and Y directions to correct the camera shake. Moreover, it is likewise possible to apply the camera shake correcting device (drive mechanism) using the correcting lens to a silver salt camera by using the film 3b instead of the CCD 3.

Figure 22:
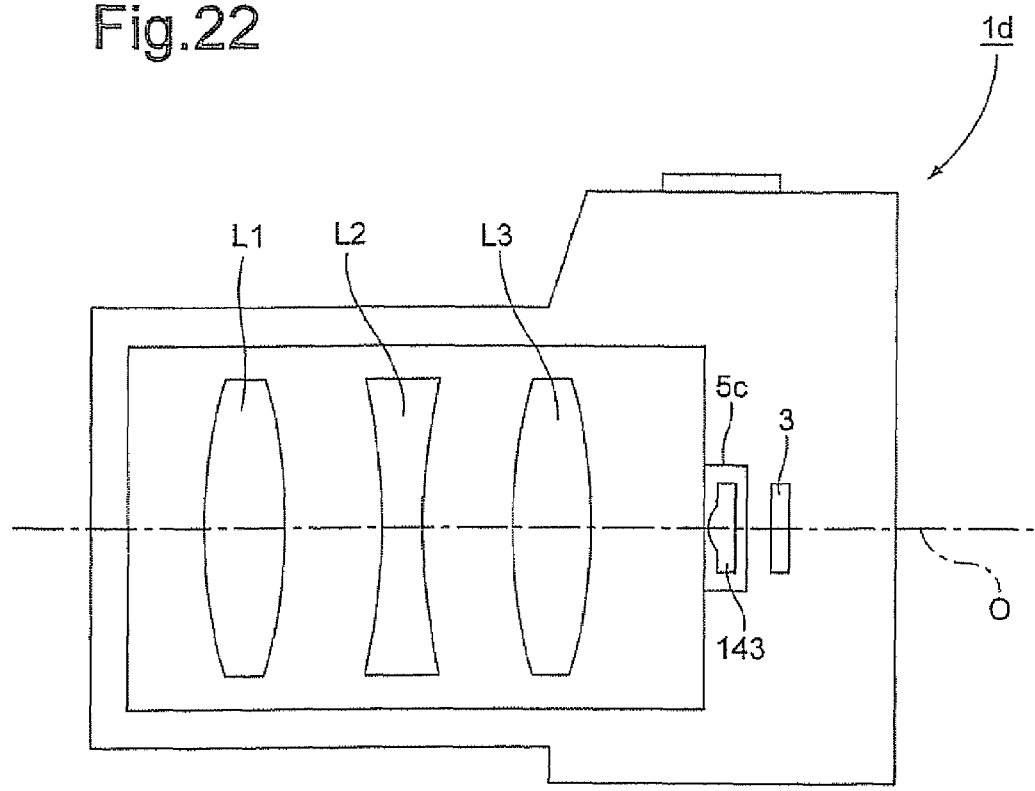
FIG. 22 is a longitudinal sectional view of a digital camera having a magnetic drive mechanism incorporated therein for driving an optical filter having a convex portion, according to another modified embodiment of the present invention.
Figure 23:
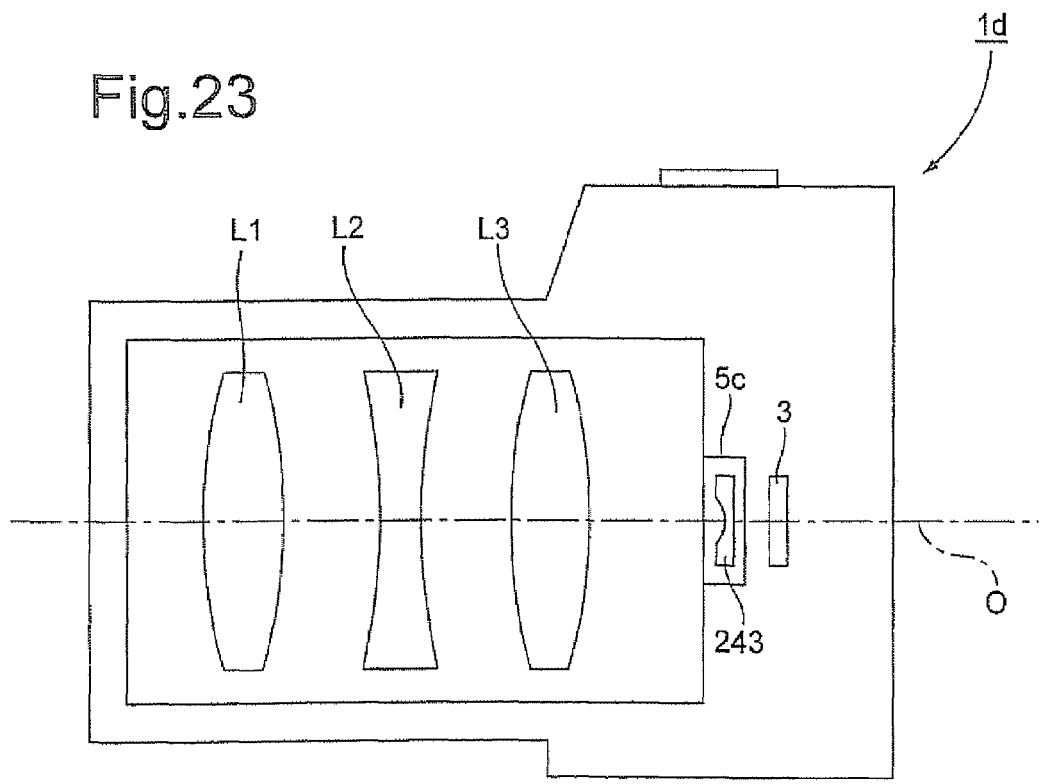
FIG. 23 is a longitudinal sectional view of a digital camera having a magnetic drive mechanism incorporated therein for driving an optical filter having a concave portion, according to another modified embodiment of the present invention.

Furthermore, in a digital camera id of an alternative embodiment shown in FIGS. 22 and 23, the CCD 3 is removed from the CCD drive mechanism 5 and is provided immovable relative to the camera body, and a low-pass filter (optical filter) 143 is provided on its front surface with a convex portion so as to have a lens function, as shown in FIG. 22, or a low-pass filter (optical filter) 243 is provided on its front surface with a concave portion so as to have a lens function, as shown in FIG. 23. In this alternative, the low-pass filter 143 or 243 is moved relative to the CCD 3 by a magnetic drive mechanism 5c, the AF operation and the camera shake correcting operation can be carried out by the low-pass filter 143 or 243.

Furthermore, the CCD drive mechanism 5 can be provided in the lens barrel rather than in the camera body.

Although the yokes YXZ and YY (magnets MX, MY, MZ) are provided on the stationary support plate 10 and the coils CX, CY and CZ are provided on the X-direction moving member 40 in the illustrated embodiment, it is possible to provide the coils CX, CY and CZ on the stationary support plate 10 and provide the yokes YXZ and YY (and magnets MX, MY and MZ) on the X-direction moving member 40.

Note that the Y-direction bar portion 31 which constitutes the Y-direction moving member 30 and the X-direction bar portions 32 and 33 do not have to be straight. For example, the Y-direction bar portion 31 can be straight in the Y-direction only at the portion which is fitted in the guide portions 23a during the movement in the Y-direction and the remaining portion of the Y-direction bar portion 31 that is not fitted in the guide portions 23a may be curved as viewed from the front thereof.

Moreover, if the rigidity of the Y-direction moving member 30 is high enough so as to be not easily elastically deformed, the number of the Y-direction guide portions 22 or the free end support portions 24 can be one. In this case, the X-direction moving member 40 can be smoothly and linearly moved in the X and Y directions.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A drive mechanism for a camera comprising:
  a movable member which is located behind a photographing lens and which is linearly movable along an optical axis of the photographing lens, said movable member supporting an image pickup device;
  an auto-focus coil secured to one of the movable member and an immovable member of the camera;
  a magnetic force generating device which is secured to the other of said movable member and said immovable member, so as to linearly move the movable member in the optical axis direction relative to said immovable member by applying a magnetic field upon said auto-focus coil; and
  a controller which controls the direction of electric current flowing in the auto-focus coil so that image light transmitted through the photographing lens is converged onto an image pickup surface of said image pickup device,
  wherein said auto-focus coil is a planar coil which is wound on a plane parallel with the optical axis.

2. The drive mechanism for a camera according to claim 1, wherein said immovable member of the camera comprises a camera body or a lens barrel provided with the camera body.

3. The drive mechanism for a camera according to claim 2, further comprising:
  a camera shake detection sensor that detects a camera shake of the camera body;
  a camera shake correction coil secured to one of the movable member and the camera body; and
  a magnetic force generating device which is secured to the other of the movable member and the camera body to linearly move the movable member relative to the camera body in orthogonal X and Y directions perpendicular to the optical axis by applying a magnetic field upon the camera shake correction coil;
  wherein said controller is controlled to supply electric current to the camera shake correction coil in accordance with camera shake information detected by the camera shake detection sensor to thereby correct the camera shake via said movement of said movable member in said orthogonal X and Y directions.

4. The drive mechanism for a camera according to claim 3, wherein said magnetic force generating devices are secured to a side of the camera body, and said auto-focus coil and said camera shake correction coil are secured to a common support plate integral with said movable member.

5. The drive mechanism for a camera according to claim 4, wherein each of said magnetic force generating devices comprises:
a yoke provided with a pair of plate portions parallel with said auto-focus coil and said camera shake correction coil so that said common support plate is located between said pair of plate portions, and
a magnet which is secured to one of said pair of plate portions of said yoke to form a magnetic circuit between said magnet and the other of said pair of plate portions in order to produce a magnetic force to be applied to said auto-focus coil and said camera shake correction coil.

6. The drive mechanism for a camera according to claim 1, wherein the controller controls the magnitude of the electric current.

7. A drive mechanism for a camera comprising:
a focusing lens which forms a part of a photographing lens system;
a movable member which supports said focusing lens and which is linearly movable along an optical axis of the photographing lens system;
an image pickup device located behind said photographing lens system;
an auto-focus coil secured to one of said movable member and an immovable member of said camera;
a magnetic force generating device which is secured to the other of said movable member and said immovable member, to linearly move said focusing lens by applying a magnetic field upon said auto-focus coil in the optical axis direction relative to said immovable member; and
a controller which controls a direction of electric current flowing in said auto-focus coil so that image light transmitted through the photographing lens system is converged onto an image pickup surface of said image pickup device,
wherein said auto-focus coil is a planar coil which is wound on a plane parallel with the optical axis.

8. The drive mechanism for a camera according to claim 7, wherein said immovable member of the camera comprises a camera body or a lens barrel provided with the camera body.

9. The drive mechanism for a camera according to claim 8, wherein the focusing lens serves also as a correction lens and wherein the drive mechanism further comprises:
a camera shake detection sensor that detects a camera shake of the camera body;
a camera shake correction coil secured to one of said movable member and said camera body; and
a magnetic force generating device which is secured to the other of said movable member and the camera body, to linearly move said movable member relative to said camera body in orthogonal X and Y directions perpendicular to the optical axis by applying a magnetic field upon said camera shake correction coil;
wherein said controller is controlled to supply electric current to the camera shake correction coil in accordance with camera shake information detected by the camera shake detection sensor to thereby correct the camera shake via movement of said movable member, to which said correction lens is supported, in said orthogonal X and Y directions.

10. The drive mechanism for a camera according to claim 9, wherein said magnetic force generating devices are secured to said camera body side, and said auto-focus coil and said camera shake correction coil are secured to a common support plate integral with the movable member.

11. The drive mechanism for a camera according to claim 10, wherein each of said magnetic force generating devices comprises:
a yoke provided with a pair of plate portions parallel with said auto-focus coil and said camera shake correction coil so that said common support plate is located between said pair of plate portions, and
a magnet which is secured to one of said pair of plate portions of said yoke to form a magnetic circuit between said magnet and the other of said pair of plate portions in order to produce a magnetic force to be applied to said auto-focus coil and said camera shake correction coil.

12. A drive mechanism for a camera comprising:
a movable member which is located behind a photographing lens and which is linearly movable along an optical axis of the photographing lens, said movable member supporting an optical filter, wherein an image pickup device is provided behind said movable member and supported by an immovable member of said camera;
an auto-focus coil secured to one of the movable member and said immovable member;
a magnetic force generating device which is secured to the other of said movable member and said immovable member, so as to linearly move the movable member in the optical axis direction relative to said immovable member by applying a magnetic field upon said auto-focus coil; and
a controller which controls the direction of electric current flowing in the auto-focus coil so that image light transmitted through the photographing lens is converged onto an image pickup surface of said image pickup device,
wherein said auto-focus coil is a planar coil which is wound on a plane parallel with the optical axis.

13. The drive mechanism for a camera according to claim 12, wherein said immovable member of the camera comprises a camera body or a lens barrel provided with the camera body.

14. The drive mechanism for a camera according to claim 12, wherein said optical filter comprises a low-pass filter having one of a concave portion and a convex portion so as to provide a lens function therein.

* * * * *